March 26, 1963 N. A. SCHUSTER 3,083,335
MAGNETIC RESONANCE METHODS AND APPARATUS
Filed Oct. 5, 1955 4 Sheets-Sheet 1

*INVENTOR.*
NICK A. SCHUSTER
BY
HIS ATTORNEY

March 26, 1963 N. A. SCHUSTER 3,083,335
MAGNETIC RESONANCE METHODS AND APPARATUS
Filed Oct. 5, 1955 4 Sheets-Sheet 2

INVENTOR.
NICK A. SCHUSTER

United States Patent Office 3,083,335
Patented Mar. 26, 1963

1

3,083,335
MAGNETIC RESONANCE METHODS AND APPARATUS
Nick A. Schuster, Ridgefield, Conn., assignor, by mesne assignments, to Schlumberger Well Surveying Corporation, Houston, Tex., a corporation of Texas
Filed Oct. 5, 1955, Ser. No. 538,578
14 Claims. (Cl. 324—.5)

The present invention relates to magnetic resonance methods and apparatus, and more particularly to new and improved methods and apparatus for detecting magnetic resonance phenomena in particles exhibiting paramagnetic properties and which may be particularly useful, for example, in the non-destructive chemical analysis of materials.

Nuclear and other paramagnetic resonances have been observed in the past as described for example by Bloembergen, Purcell, and Pound in an article entitled "Relaxation Effects in Nuclear Magnetic Resonance Absorption," Physical Review, vol. 73, page 679 (1948), by Bloch, Hansen and Packard in an article entitled "The Nuclear Induction Experiment," Physical Review, vol. 70, page 474 (1946), and by E. L. Hahn in an article entitled "Spin Echoes," Physical Review, vol. 80, page 580 (1950). In general, a sample containing paramagnetic particles is placed in a constant magnetic field that is substantially homogeneous throughout the sample. An alternating magnetic field is applied to the sample perpendicularly to the constant magnetic field and at a frequency substantially equal to the resonance precession frequency of the paramagnetic particles in the constant field. Under these conditions the magnetic moments associated with particular particles will precess at the resonance precession frequency, and this resonance is observed in one of the following ways: (1) as a result of the absorption or dispersion of the applied alternating magnetic field; (2) as a result of the voltage induced by the magnetic field generated at the precession frequency by the precessing magnetic moments; or (3) by modulating either the constant magnetic field or the applied alternating magnetic field, or both, and observing the effects of the modulation on the resonance signal detected in accordance with either of the first two methods above. It should be noted that regardless of the observation method employed, the resonance is detected at the resonance precession frequency which is also the frequency of the applied alternating magnetic field.

Such methods have been successful in the carefully controlled conditions of a laboratory where time and care may be taken to distinguish the resonance signal from the far larger applied alternating magnetic field of the same frequency. In addition, in the laboratory both the constant and the applied alternating magnetic fields may be made almost completely homogeneous throughout the sample, whereby the resonance signal is maintained at a relatively high intensity. However, for commercial reasons it is not always possible to use laboratory time and care to detect resonance. In addition, where the magnetic fields cannot for practical reasons be made homogeneous, the resonance signal will be of relatively low intensity, and since this signal is at the same frequency as the applied alternating field, the small resonance signal may be difficult to detect in the presence of the relatively large alternating field at the same frequency.

Accordingly, it is a primary object of the present invention to provide new and improved methods and apparatus for detecting magnetic resonance phenomena which are of particular utility where high degrees of field homogeneities are not practical.

Another object of the present invention is to provide new and improved magnetic resonance detecting methods and apparatus in which the resonance is detected at a frequency substantially different from the resonance precession frequency.

These and other objects of the invention are attained by applying an alternating magnetic field substantially perpendicularly to a constant magnetic field within a sample containing paramagnetic particles. The frequency of the alternating magnetic field is selected substantially equal to the resonance precession frequency of the particles in the constant magnetic field. The alternating magnetic field is modulated and the effect of this modulation on the constant magnetic field is detected, i.e., the variations in the magnetic field which is substantially perpendicular to the precessing components of the magnetic moments are detected. Substantially no signal at the resonance frequency is induced in the direction of the constant magnetic field since both the applied and the induced alternating magnetic fields are perpendicular thereto thus simplifying the detection of variations in said constant field resulting from resonance. Further, the resonance is detected at a frequency which is dependent on the amplitude of the applied alternating magnetic field and which is selected to be substantially different from the resonance precession frequency.

In one typical embodiment the alternating magnetic field is applied periodically in the form of pulses of predetermined intensity. The relaxation signal is detected at a frequency which is proportional to the selected intensity of the applied alternating field. In a second typical embodiment the alternating magnetic field is applied continuously and is amplitude-modulated. The resonance is observed by detecting the variations in magnetic susceptibility resulting from the modulation. In a third typical embodiment the alternating magnetic field is applied in the form of pulses which change the magnetic susceptibility, and this change is detected in the intervals between pulses. An arrangement for utilizing the principles of the present invention in the logging of earth formations is described.

The invention will be more fully understood with reference to the accompanying drawings in which.

Figure 1:
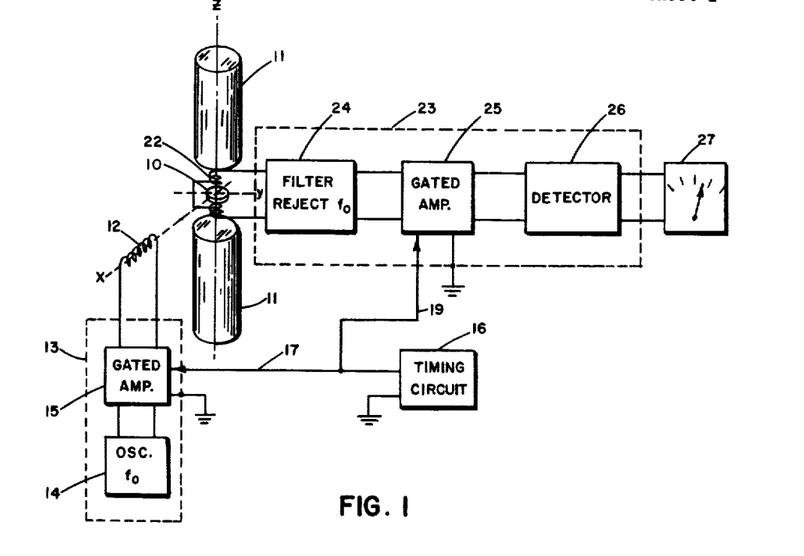
FIG. 1 illustrates typical apparatus for carrying out one embodiment of the invention.

In the apparatus shown in FIG. 1 a sample 10 containing paramagnetic particles having a gyromagnetic ratio $\gamma$ is, for ease in explanation, shown placed between the pole faces of a permanent or electromagnetic 11 which generates a substantially constant magnetic field parallel to the axis $z$ and has an average intensity $H_0$ throughout paramagnetic sample 10. However, it will be understood that since the present invention does not require the high degree of field homogeneity heretofore necessary, it will find its greatest utility in applications where the material to be investigated cannot actually be placed between the pole faces of a magnet. A coil 12 is mounted to have its longitudinal axis $x$ perpendicular to the $z$ axis through sample 10 and is adapted to be energized by current from R.F. current generator 13.

In this embodiment of the invention generator 13 may comprise a crystal-controlled oscillator 14 generating current of frequency $f_0$ which is coupled to coil 12 through an amplifier 15 adapted to be gated by pulses from timing circuit 16 via conductor 17. The frequency $f_0$ is selected substantially equal to the resonance precession frequency of the paramagnetic particles in the constant field of average intensity $H_0$ where $$f_0 = \gamma H_0 / 2\pi \quad (1)$$

Thus when gated amplifier 15 is closed by pulses 18 (FIG. 2) of duration $\tau_1$, R.F. current 20 of predetermined intensity is passed through coil 12. This current passing through coil 12 generates an alternating magnetic field of average intensity $2H_1$ throughout paramagnetic sample 10. The significant component of this alternating field has an intensity $H_1$ effectively rotating about the $z$ axis in the $x$, $y$ plane at the angular frequency $\omega_0 = 2\pi f_2$. As is well-known, the other component of intensity $H_1$ is effectively rotating in the opposite direction at the angular frequency $\omega_0$ and may thus be disregarded.

Figure 2:
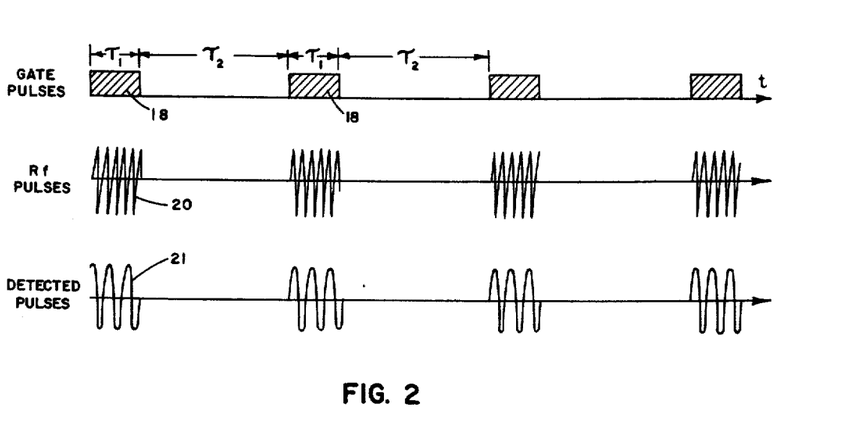
FIG. 2 is a series of pulse diagrams utilized to explain the operation of the apparatus shown in FIG. 1.

As shown in FIG. 2, after an interval $\tau_1$, the gated amplifier 15 is opened for a period $\tau_2$ during which time the alternating magnetic field at frequency $\omega_0$ (hereinafter referred to as $H_1$) is not applied to sample 10. The periods $\tau_1$ and $\tau_2$ may thereafter be repeated indefinitely. In this first embodiment of the invention the periods $\tau_1$ should be no longer than $T_2^*$ where $$T_2^* = 1/\gamma \Delta H_0 \quad (2)$$

and where $\Delta H_0$ is the half-width of the inhomogeneity in field $H_0$ throughout that portion of sample 10 under investigation. The periods $\tau_2$ should be at least as long as the relaxation time $T_1$ associated with the precession. Under these circumstances, an alternating magnetic field of frequency $f_1$ will exist along the $z$ axis superposed on the constant field perpendicular to activating coil 12, during the intervals $\tau_1$, where $$f_1 = \gamma H_1 / 2\pi \quad (3)$$

This alternating magnetic field will induce a signal 21 (FIG. 2) at frequency $f_1$ in a coil 22 having its longitudinal axis parallel to the $z$ axis.

The output of coil 22 may be connected to any suitable detecting apparatus 23. For example, as shown in FIG. 1, detecting apparatus 23 may comprise a filter 24 adapted to reject any signal at the resonance frequency $f_0$ induced in coil 22 from coil 12 and to pass any signal of frequency $f_1$. The rejection of frequency $f_0$ is desirable for, while coil 22 is substantially perpendicular to both the induced and applied alternating fields of frequency $f_0$, it is not possible to eliminate entirely frequency $f_0$ from the output of coil 22. The output of filter 24 at frequency $f_1$ may be amplified by amplifier 25 and detected by detector 26, the output of which may be connected to a meter 27 indicating resonance. To increase the signal-to-noise ratio, amplifier 25 may be of the gated type so that the detecting apparatus is activated only during the periods $\tau_1$, by the connection of amplifier 25 to timing circuit 16 via conductor 19.

As can be seen from relations (1) and (3) above, by properly selecting the intensity of the current through coil 12 so as to make $H_1$ appreciably different from $H_0$, frequency $f_1$ will be distinctly different from frequency $f_0$. Accordingly, the resonance signal may be easily separated from any induced signal of frequency $f_0$ by means of detecting apparatus 23.

In a typical example adapted for the detection of nuclear magnetic resonance, assume it is desired to detect hydrogen (proton) resonance in sample 10, where $$\gamma = 2.67 \times 10^4$$

and $T_1 = 1$ sec. If $H_0 = 250$ gauss, from relation (1) above, $f_0$ should be approximately equal to 1.06 mc. If $H_1$ is selected equal to 20 gauss, then $f_1$ will be equal to 85 kc. If $T_2^* = 10^{-3}$ sec., then $\tau_1$ may be made equal to $\frac{1}{2} \times 10^{-3}$ sec., while $\tau_2$ is selected equal to 1 sec.

Figure 3:
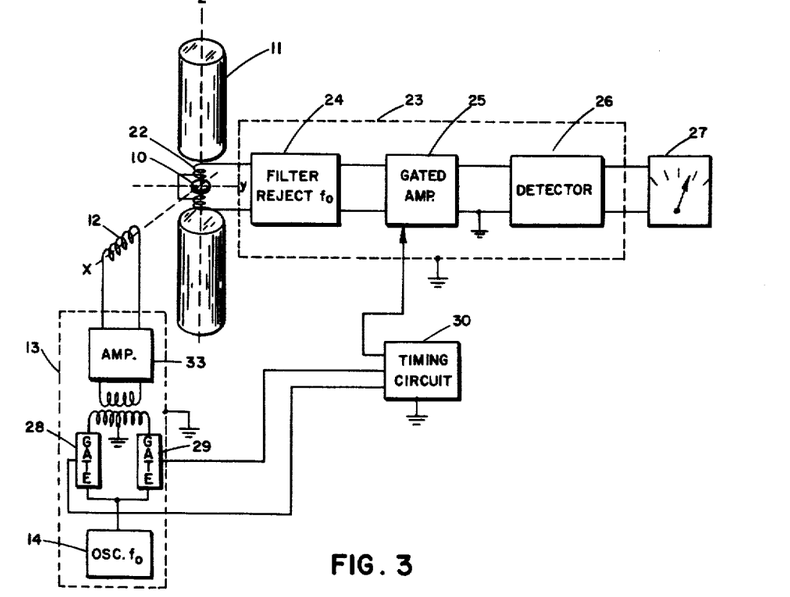
FIG. 3 illustrates a modification of the apparatus shown in FIG. 1 for increasing the signal-to-noise ratio.

A modification of the apparatus shown in FIG. 1 to incorporate some of the principles disclosed in my copending application Serial No. 463,776 filed October 21, 1954 for: "Magnetic Resonance Methods and Apparatus," now Patent No. 2,968,762 issued January 17, 1961, is shown in FIG. 3, where elements having similar functions to elements shown in FIG. 1 bear the same numerical designations. In accordance with the principles set forth in said copending application, the duration of interval $\tau_1$ may be increased relative to the duration of the interval $\tau_2$, thereby increasing the time during which measurements are made, and thus increasing the signal-to-noise ratio. To this end the phase of the alternating current activating coil 12 is periodically reversed during the interval $\tau_1$. To accomplish this, the output of oscillator 14 may be split between two gate circuits 28 and 29 which, when closed, give respectively oppositely phased current into the input of amplifier 33.

Thus when gate 28 is closed by a pulse from timing circuit 30, current of one phase at frequency $f_0$ passes through the coil 12 while when gate 29 is closed by a pulse from timing circuit 30, current of frequency $f_0$ but of opposite phase passes through coil 12. In a typical example, during the interval $\tau_1$ (FIG. 4) gate 28 is first closed for a period $t_1$ of duration such that $$t_1 = \frac{2\pi}{\gamma H_1}$$

(known as a $+2\pi$ pulse in said copending application). Gate 28 is then opened and gate 29 closed for a period $t_2$ where $$t_2 = \frac{4\pi}{\gamma H_1}$$

Figure 4:
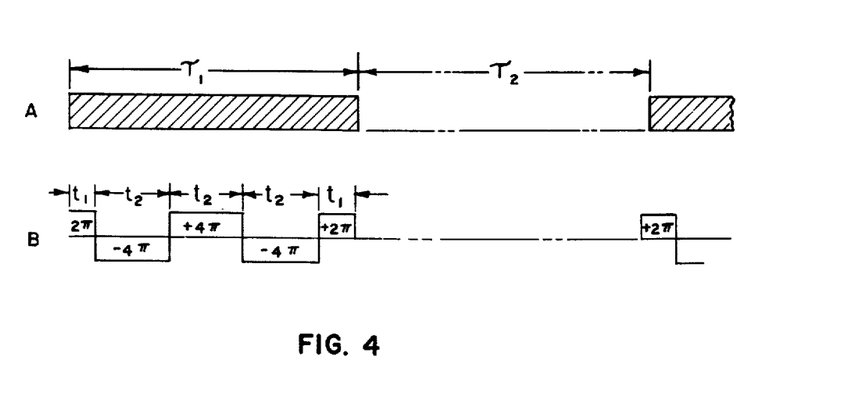
FIG. 4 is a series of pulse diagrams utilized to explain the operation of the apparatus shown in FIG. 3.

(known as a $-4\pi$ pulse in said copending application). Gate 29 is then opened and gate 28 closed for a period $t_2$ ($+4\pi$), followed by a period $t_2$ during which gate 29 which is closed ($-4\pi$) and terminated by a period of duration $t_1$ during which gate 28 is closed ($+2\pi$). This sequence is shown in FIG. 4B.

The detecting apparatus 23 may be identical to the apparatus disclosed in FIG. 1, the gated amplifier 25 being closed for the entire period $\tau_1$. It will be understood that the $+2\pi$, $-4\pi$, $+4\pi$, $-4\pi$, $+2\pi$ sequence discussed in connection with FIG. 3 is merely exemplary and the other sequences suggested in said copending application may be employed, except those in which the resonance is to be measured during a free precession interval when the moments are substantially perpendicular to the constant magnetic field.

The embodiments described in connection with FIGS. 1 and 3 may be conveniently combined with other detecting methods to further increase the signal-to-noise ratio. For example, in circuits shown in FIGS. 1 and 3 a second detecting coil may be placed along the $y$ axis perpendicularly to the z and x axes and the resonance signal induced at the resonance precession frequency detected therein in the usual manner. This induced signal may be combined with the one detected by detecting apparatus 23, thereby increasing the signal-to-noise ratio. In connection with the apparatus described with respect to FIG. 3, the circuits described in connection with the aforementioned copending application may be used to detect the resonance in addition to that shown in FIG. 3 and the two resonance signals detected and combined. In the apparatus shown in FIG. 1, coil 12 may form a portion of a bridge circuit utilized to detect the absorption of energy at frequency $f_0$ in coil 12 and this absorption signal combined with the resonance signal detected in the output of coil 22 to increase the signal-to-noise ratio.

Figures 5, 8:
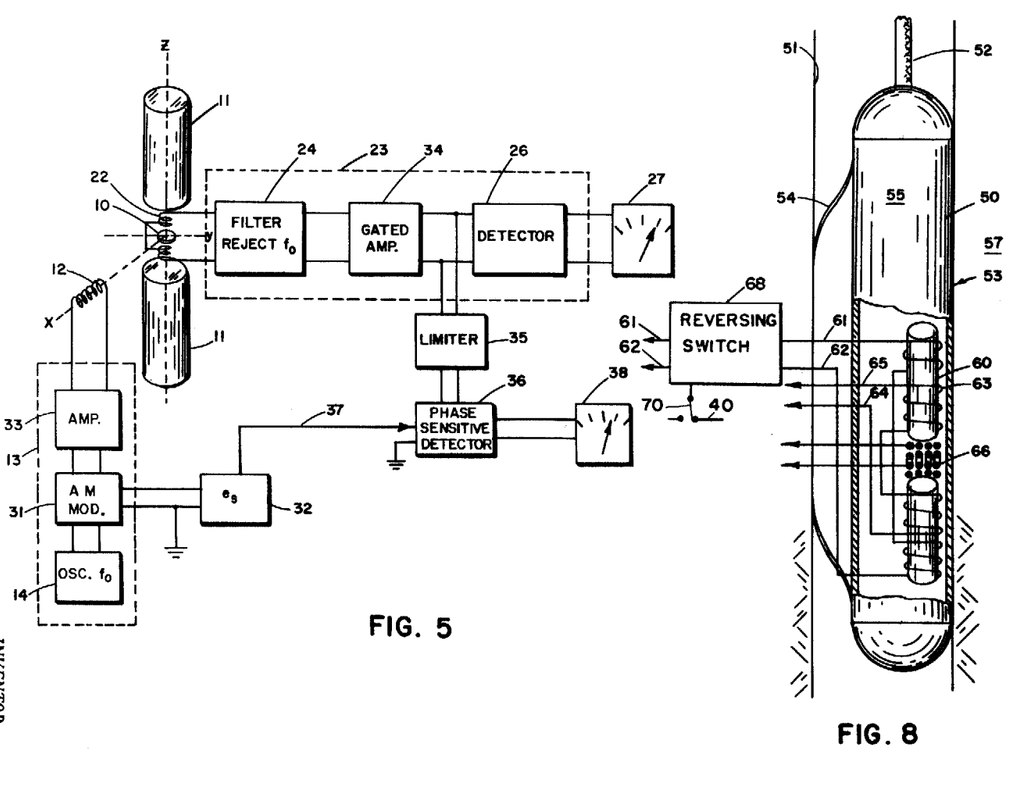
FIG. 5 illustrates a typical form of apparatus for carrying out a second embodiment of the invention.
FIG. 8 represents apparatus construction in accordance with the invention suitable for making measurements of the formations traversed by a borehole.

In FIG. 5 there is shown an embodiment in which the alternating magnetic field is continuously applied. In order to better understand the embodiment shown in FIG. 5, consider a region within sample 10 in which the intensity of the field generated by magnet 11 is actually $H_0$. If this region contains, for example, hydrogen nuclei, this region will have a Curie susceptibility (magnetic susceptibility at zero frequency) given by $$X_0 = K\gamma^2 N/T \qquad (4)$$

where K is a constant, N is the number of hydrogen nuclei in sample 10 and T is the temperature. If now the field $H_1$ at frequency $f_0$ is turned on by applying alternating current to coil 12, transitions will be induced between the two possible magnetic dipole states and the population levels of the two states will tend to equalize after a period of time dependent on the relaxation time $T_2^*$. As the population levels of the two states tend to become equalized, the magnetic susceptibility $X_0$ of sample 10 is reduced. In other words, from relation (4) above energy coupled from coil 12 to sample 10 raises "the effective temperature" T of the nuclei, thereby reducing $X_0$. By modulating in amplitude the field $H_1$ at a relatively low frequency, the magnetic susceptibility along the z axis will be modulated in amplitude, thus producing a modulation of the total flux linking coil 22. This signal will be of constant frequency which was the frequency of the modulation of $H_1$.

Thus in FIG. 5 the output of oscillator 14 at frequency $f_0$ is amplitude-modulated in modulator 31 by a signal $e_s$ of frequency $f_s$ generated in low frequency source 32 and applied to coil 12 through amplifier 33. The field $H_1$ is thus continuously applied by coil 12 and is modulated in amplitude by signal $e_s$. This in turn modulates the magnetic susceptibility along the z axis at frequency $f_s$. The signal along the z axis at frequency $f_s$ picked up by coil 22 may be passed through filter 24 which rejects any signal of frequency $f_0$, amplified by amplifier 34, detected by detector 26 and indicated on meter 27 as a function of the resonance within sample 10. As a typical example, the intensities of $H_0$ and $H_1$ may be the same as described in connection with FIG. 1, with the signal $e_s$ providing modulation in the range from 50 to 100% at a frequency $f_s$ such that $1/f_s$ is approximately equal to the relaxation time $T_1$. However, in the cases where the relaxation time $T_1$ is extremely short, for example in electron paramagnetic resonances, the periods $1/f_s$ may of practical necessity be made longer than the time $T_1$. Also, in the cases where the relaxation time $T_1$ is relatively long, as in the case of proton resonance, it may be desirable to decrease the period $1/f_s$ since electronically it is often difficult to accurately detect signals at a very low frequency, e.g., one cycle/second.

In addition, the apparatus shown in FIG. 5 may be utilized to measure the relaxation time $T_1$ of the resonance phenomenon. To this end the output of amplifier 34 may be applied to a limiter 35 having a constant output regardless of the intensity of the resonance signal picked up in coil 22. The phase of the output of limiter 35 and thus the phase of the resonance signal detected in coil 22 is compared to the phase of the modulation envelope modulating the current through coil 12. To this end output limiter 35 is applied to phase sensitive detector 36 sensitized by a reference signal from generator 32 via conductor 37. The variations in the output of the phase sensitive detector indicate the variations in phase of the signal detected in coil 22 as the sample 10 is moved relative to magnet 11. These variations are a function of the variations of the relaxation time $T_1$ and may be indicated on a meter 38. As disclosed in my copending application Serial No. 330,978 filed January 13, 1953, for "Analysis of Substances by Measurement of Nuclear Relaxation Time," the measurement of $T_1$ is indicative of the particular compound in which the paramagnetic particles under investigation are found. Thus the apparatus shown in FIG. 5 may be utilized to determine the presence of particular paramagnetic particles and to indicate the particular compound containing said particles.

Figure 6:
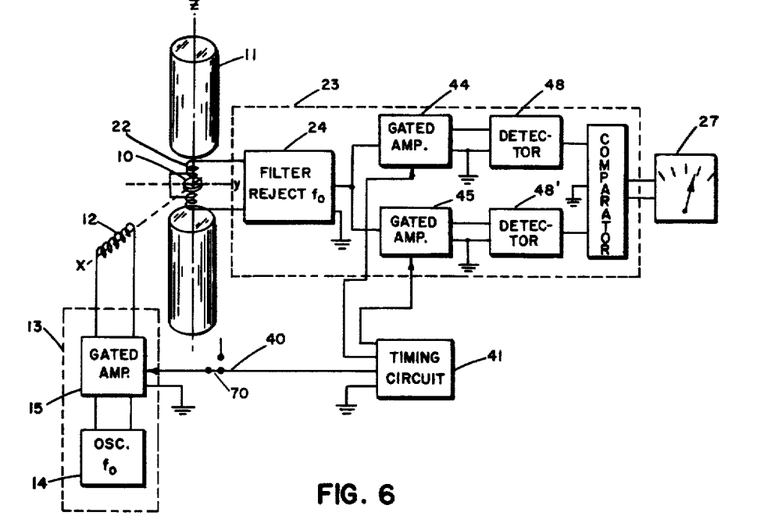
FIG. 6 illustrates a form of apparatus for carrying out a third embodiment of the invention.
Figure 7:
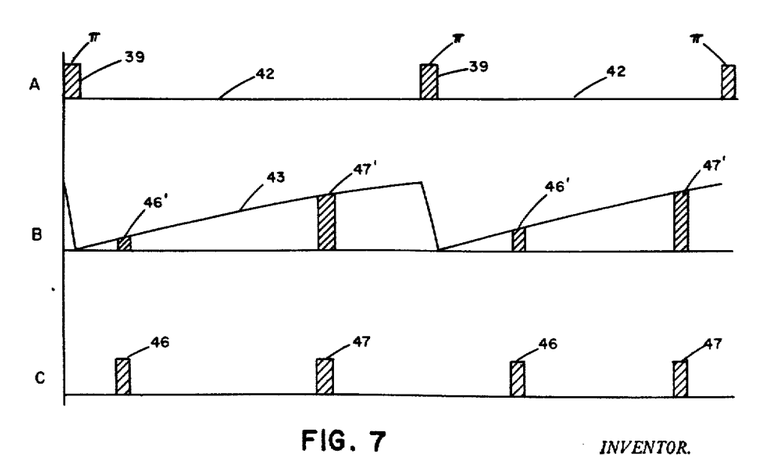
FIG. 7 is a pulse diagram utilized to explain the operation of the apparatus shown in FIG. 6.

While the signal $e_s$ is indicated in connection with FIG. 5 as being a sine wave, it may be a square wave, providing for example 100% modulation In FIG. 6 is shown additional apparatus for measuring relaxation time in accordance with the present invention. Current at frequency $f_0$ is applied to gated amplifier 15. Periodically amplifier 15 is closed by pulses 39 (FIG. 7A) on conductor 40 from timing circuit 41. The duration of these pulses is approximately equal to $\pi/\gamma H_1$, where $H_1$ is the effective intensity of the alternating field applied through sample 10 by coil 12. Thus the alternating field is applied for periods of duration just long enough to nutate the macroscopic moments previously aligned with field $H_0$ by $\pi$ radians (a "$\pi$ pulse") or 180° to a position opposite to the direction of the constant magnetic field. Between pulses 39 occur periods 42 during which no alternating field is applied and during which the moments are allowed to relax back into line with the constant field. This causes an effective modulation of the magnetic susceptibility as shown by the curve 43 (FIG. 7B) which increases during periods 42 exponentially as a function of relaxation time $T_1$.

The intensity $H_1$ is made as large as practical so that the pulses 39 may be as short as possible. In any event, the duration of pulses 39 must be short with respect to the anticipated relaxation time $T_1$ of the particles under investigation. It should be noted that even though field $H_1$ is not homogeneous, any moments which are nutated out of alignment with the direction of the field $H_0$ will contribute to the effect, and those moments which are nutated between $\pi/2$ and $3\pi/2$, for example, will contribute substantially to the effect.

Alternatively, after the macroscopic moments are aligned with the field $H_0$ in one direction, the direction of this field may be reversed in a time short with respect to the relaxation time $T_1$. Thus the moments will be substantially 180° out of line with the field $H_0$. In the intervals of duration at least equal to $T_1$ between field reversals, the moments are allowed to relax back into line with the constant field $H_0$, thereby modulating the magnetic susceptibility. The field $H_0$ may be reversed by utilizing an electromagnet to generate $H_0$ and periodically reversing the direction of the direct current passing therethrough. In this arrangement no applied alternating field ($H_1$) is required. The detecting circuit is preferably opened during the times when the field is being reversed.

The variations in magnetic susceptibility along the z axis may be detected in any known manner. For example, as shown in FIG. 6, the field variations as detected by coil 22 may be applied to filter 24 and thence in parallel to gated amplifiers 44 and 45. The gating of these amplifiers is timed to sample curve 43 at two distinct times during each cycle. For example, shortly after each pulse 39, amplifier 44 is closed by pulses 46 sampling the amplitude of curve 43 at point 46'; then amplifier 45 is closed by pulses 47 at a later time, giving sample 47'. Samples 46' and 47' are detected by detectors 48 and 48' respectively. Their intensities are compared by amplitude comparator 49 and the difference indicated by meter 27. This difference is indicative of the relaxation time $T_1$.

In the previous embodiments coil 22 is shown in the interval between pole faces. It wil be appreciated that this coil may be anywhere in the constant magnetic circuit so as to detect variations therein. In addition, other known types of magnetic field sensing elements may be employed.

The apparatus described in the foregoing embodiments are extremely useful, for example, in the non-destructive chemical analysis of materials. For example, the previous embodiments may be conveniently utilized in connection with the logging of the formations traversed by a borehole. Typically, as shown in FIG. 8 a pressure-resistant non-magnetic housing 50 is adapted to be raised and lowered through a borehole 51 by means of an electrical cable 52 and winch (not shown) at the surface of the earth. One face 53 of housing 50 is adapted to be pressed against the wall of the borehole 51 continuously by means of a spring 54. Within the upper portion 55 of housing 50 may be the necesary electronics and power supply circuits to operate in accordance with the invention. Immediately below cartridge 55 there is an electromagnet 60 activated by carefully regulated constant D.C. current through conductors 61 and 62. A detecting coil 63 wound parallel to the axis of magnet 60 has as its output conductors 64 and 65. A coil 66 at right angles to the magnetic field produced by magnet 60 is utilized to generate the field $H_1$ within the formation material.

In operation, housing 50 is lowered to the bottom of the lowermost portion of the borehole in which a log is desired. It is then raised slowly. As housing 50 is raised, the earth material to be analyzed will pass within the influence of the field $H_0'$ generated in formations by magnet 60 parallel to the vertical axis of the borehole. The constant field generated by magnet 60 will decrease with the distance from the wall of borehole 50. If for example it is desired to detect resonance in the formation material between 6 inches and 12 inces from the wall of the borehole, coil 66 will be activated by a band of frequencies in the spectrum between $\gamma H_0'$ at 6 inches through $\gamma H_0'$ at 12 inches.

This band of frequencies applied to coil 66 is modulated in amplitude by the signal $e_s$ as described in connection with FIG. 5. The variations in magnetic susceptibility will appear in the output 64—65 of coil 63, as explained above, and may be utilized to determine the presence of resonance and of the relaxation time of the materials involved.

Accordingly, contrary to the prior art, it is not necessary that an extremely homogeneous field be employed since the band of frequencies can be employed to activate coil 66, the resonance signal being detected at the frequency $f_s$. In addition, the apparatus is made sensitive to the material within a predetermined depth of the borehole, thus sensitizing the equipment to the desired formation material and de-sensitizing it to undesired material. Obviously the other embodiments described above may be used in connection with the borehole apparatus as shown typically in FIG. 8. For example, a reversing switch 68 may be connected between a regulated constant D.C. source and electromagnet 60 by conductors 61 and 62 in order to reverse the field $H_0$ in a time short with respect to relaxation time $T_1$ of the material undergoing investigation. As described above, no applied alternating field ($H_1$) is required in order to pick up the signal due to relaxation by means of detecting coil 63. Instead, conductor 40 may be connected to supply pulses 39 to reversing switch 68 (FIG. 8) so that the polarizing field is switched at a time when the gating amplifiers 44, 45 (FIG. 6) are closed to block signal transmission to the detectors. In this case, of course, pulses 39 are of a duration short with respect to the relaxation time $T_1$ but need not be of the same interval $\pi/\gamma H_1$. Rather than change the connection of conductor 40 from amplifier 15 (FIG. 6) to reversing switch 68 (FIG. 8), a two-pole switch 70 may instead be used for this purpose.

It will occur to those skilled in the art that the foregoing is subject to many modifications. For example, the constant field $H_0$ may be the earth's magnetic field, in which event no permanent or electromagnet 11 will be necessary. Thus the representative embodiments illustrated above are not considered as limiting the appended claims.

I claim:

1. Apparatus for observing magnetic resonance phenomena in particles exhibiting paramagnetic properties wherein a substantially constant magnetic field is applied to said particles comprising means for applying an alternating magnetic field of effective intensity $H_1$ to said particles during first time intervals, said alternating magnetic field effectively rotating perpendicularly to said constant magnetic field at substantially the resonance precession frequency of said particles in said constant magnetic field, said first time intervals being separated by second time intervals of duration long with respect to said first time intervals, a filter for rejecting said precession frequency, and means including said filter and a detector coupled to the output thereof, for detecting variations in said constant magnetic field during said first time intervals at a frequency substantially equal to $\gamma H_1/2\pi$, where $\gamma$ is the gyromagnetic ratio for said particles.

2. Apparatus for observing magnetic resonance phenomena in particles exhibiting paramagnetic properties wherein a substantially constant magnetic field is applied to said particles comprising means for applying an alternating magnetic field to said particles during first time intervals, said alternating magnetic field effectively rotating perpendicularly to said constant magnetic field at substantially the resonance precession frequency of said particles in said constant magnetic field, said first time intervals being separated by second time intervals of duration long with respect to said first time intervals, means for periodically reversing the phase of said alternating magnetic field during said first time intervals, and means for detecting variations in said constant magnetic field during said first time intervals at a frequency proportional to the intensity of said alternating magnetic field.

3. Apparatus for observing magnetic resonance phenomena in particles exhibiting paramagnetic properties wherein a substantially constant magnetic field is applied to said particles comprising means for applying an alternating magnetic field to said particles effectively rotating perpendicularly to said constant magnetic field at substantially the resonance precession frequency of said particles in said constant magnetic field, means for modulating the intensity of said alternating magnetic field with a first signal of a second frequency substantially lower than said resonance precession frequency, means for detecting a second signal proportional to the variations in said constant magnetic field at said second frequency, and means for comparing the phase of said second signal with the phase of said first signal independently of amplitude variations to provide indications of the phase variations of said second signal with respect to said first signal.

4. Apparatus for observing magnetic relaxation phenomena in particles exhibiting paramagnetic properties comprising means for applying a polarizing magnetic field to said particles, means for periodically reversing the direction of said polarizing magnetic field during intervals short with respect to the relaxation time $T_1$ associated with said particles, and means for detecting variations in the resultant magnetic field in the vicinity of said particles which are a function of magnetic relaxation of said particles during the periods between said intervals.

5. Apparatus for observing magnetic resonance phenomena in particles exhibiting paramagnetic properties and having a gyromagnetic ratio $\gamma$ wherein a substantially constant magnetic field is applied to said particles comprising means for applying an alternating magnetic field of effective intensity $H_1$ and given phase to said particles during first time intervals of duration substantially equal to $\pi/\gamma H_1$, said alternating magnetic field effectively rotating perpendicularly to said constant magnetic field at substantially the resonance precession frequency of said particles in said constant magnetic field, said first time intervals being separated by second time intervals of duration long with respect to said first time intervals, and means including a filter to block signals at said precession frequency for detecting variations in said constant magnetic field during said second time intervals.

6. Apparatus for logging the formations traversed by a borehole comprising a support adapted to be passed through said borehole, means in said support for applying a substantially constant magnetic field to said formations, means in said support for applying an alternating magnetic field to said formations, said alternating magnetic field effectively rotating perpendicularly to said constant magnetic field at substantially the resonance precession frequency of particular paramagnetic particles in a constant field of the intensity of said constant field in at least one location in said formations, means for modulating the intensity of said alternating magnetic field, and means for detecting variations in said constant magnetic field resulting from said modulation.

7. Apparatus for logging the formations traversed by a borehole comprising a support adapted to be passed through said borehole, means in said support for applying a substantially constant magnetic field to said formations, means in said support for applying an alternating magnetic field to said formations, said alternating magnetic field effectively rotating perpendicularly to said constant magnetic field in a band of frequency corresponding to the resonance precession frequencies of particular paramagnetic particles in a constant magnetic field having intensities of said constant field at a plurality of locations in said formations, means for modulating the intensity of said alternating magnetic field, and means for detecting variations in said constant magnetic field resulting from said modulation.

8. In a method of determining the magnetic resonance properties of that portion of material located at a predetermined depth beneath the surface of said material, the steps of applying a substantially constant divergent magnetic field between spaced-apart locations on said surface whereby said field decreases in intensity with the distance behind said surface, applying an alternating magnetic field perpendicularly to said constant field in said material and at a frequency equal to the resonance precession frequency of selected paramagnetic particles in a constant field of the particular intensity of said constant field at the predetermined depth of said portion, and obtaining indications of the magnetic resonance in said particles.

9. In a method of obtaining signals representative of magnetic resonance phenomena in particles exhibiting paramagnetic properties wherein a substantially constant magnetic field is applied to said particles, the steps of applying an alternating magnetic field of given phase to said particles substantially at right angles to said constant field and having a frequency substantially equal to the resonance precession frequency of said particles in said constant field, periodically reversing the phase of said alternating field after an interval given by $n\pi/2\gamma H_1$ where $\gamma$ is the gyromagnetic ratio for said particles, $H_1$ is the effective intensity or said alternating magnetic field and $n$ is an integer between 1 and 4, and deriving a signal at the nutational frequency of said particles during said periodic reversal responsive to variations in the intensity of said constant field.

10. In a method of obtaining signals representative of magnetic resonance phenomena in particles exhibiting paramagnetic properties wherein a substantially constant magnetic field is applied to said particles, the steps of applying an alternating magnetic field of given phase to said particles substantially at right angles to said constant field and having a frequency substantially equal to the resonance precession frequency of said particles in said constant field, amplitude modulating said alternating field at a given relatively low frequency, detecting variations in said constant field at said given frequency, subjecting said substantially constant magnetic field and said particles to relative movement, and deriving indications of the magnetic relaxation time of said particles responsive solely to the difference in phase of said detected variations and field modulation as said particles and said constant field are subjected to relative movement.

11. A method for investigating earth formations traversed by a borehole and containing particles exhibiting paramagnetic properties in the presence of a magnetic field $H_0$ applied to said particles, comprising the steps of periodically reversing the magnetic field applied to said particles in successive earth formations to subject said particles to successive magnetic fields in opposite directions during the time intervals which are long relative to the time intervals for reversing said magnetic field, and during alternate time intervals detecting the magnetic relaxation signal resulting from relaxation of the macroscopic magnetic moment associated with said particles toward alignment with said magnetic field.

12. A method for investigating earth formations traversed by a borehole and containing particles exhibiting paramagnetic properties in the presence of a magnetic field $H_0$ applied to said particles, comprising the steps of periodically reversing the magnetic field applied to said particles in successive earth formations to subject said particles to successive magnetic fields in opposite directions during time intervals which are long relative to the time intervals for reversing said magnetic field, detecting at different times during alternate time intervals the magnetic relation signal resulting from relaxation of the macroscopic magnetic moment associated with said particles toward alignment with said magnetic fields, and deriving an indication of the comparative magnitude of said relation signal at said different times.

13. A method for investigating earth formations traversed by a borehole and containing particles exhibiting paramagnetic properties in the presence of a magnetic field $H_0$ applied to said particles, comprising the steps of periodically reversing the magnetic field applied to said particles in successive earth formations to subject said particles to successive magnetic fields in opposite directions during first time intervals which are long relative to second time intervals for reversing magnetic field, and during said first time intervals detecting the magnetic relaxation signal resulting from relaxation of the macroscopic magnetic moment associated with said particles toward alignment with said magnetic field, said first time intervals being sufficiently long for said moments to relax substantially into alignment with said magnetic field, and deriving indications of said relaxation signal to provide a log of said earth formations.

14. A method for investigating earth formations traversed by a borehole and containing particles exhibiting paramagnetic properties in the presence of a magnetic field $H_0$, comprising the steps of applying a magnetic field to said particles in successive earth formations in a given direction during first time intervals and in an opposite direction during alternate time intervals which time intervals are long relative to the time for reversing said magnetic field, and during said time intervals detecting the magnetic relaxation signal resulting from relaxation of the macroscopic magnetic moment associated with said particles toward alignment with said magnetic field.

(References on following page)

References Cited in the file of this patent

UNITED STATES PATENTS

| | | |
|---|---|---|
| 2,561,489 | Bloch et al. | July 24, 1951 |
| 2,705,790 | Hahn | Apr. 5, 1955 |

OTHER REFERENCES

Bloembergen et al.: Physical Review, vol. 93, No. 1, Jan. 1, 1954, pp. 72–83.

Damon: Reviews of Modern Physica, vol. 25, No. 1, January 1953, pp. 239-245.

Bloom et al.: Physical Review, vol. 97, No. 6 pp. 1699–1709, Mar. 15, 1955.

Physical Review, vol 93, No. 4, February 1954, page 941, Abstracts A7 and A8.

"Relaxation Effects in Nuclear Magnetic Resonance Absorption," by Bloembergen et al., "Physical Review," vol. 73, No. 7, April 1948, pp. 679–712.

"Measurement of Electronic Susceptibilities by Means of Nuclear Resonance Absorption," by Feher et al., "Rev. of Sci. Inst.," vol. 26, No. 3, March 1955.

Hahn: Physical Review, vol. 76, No. 1, July 1, 1949, pp. 145–146;

Torrey: Physical Review, vol. 76. No. 8, Oct. 15, 1949, pp. 1059–1066.

Notice of Adverse Decision in Interference

In Interference No. 93,939 involving Patent No. 3,083,335, N. A. Schuster, MAGNETIC RESONANCE METHODS AND APPARATUS, final judgment adverse to the patentee was rendered Jan. 29, 1970, as to claim 8.

[*Official Gazette July 7, 1970.*]

Disclaimer 3,083,335.—*Nick A. Schuster*, Ridgefield, Conn. MAGNETIC RESONANCE METHODS AND APPARATUS. Patent dated Mar. 26, 1963. Disclaimer filed May 15, 1970, by the assignee, *Schlumberger Technology Corporation*.

Hereby enters this disclaimer to claim 8 of said patent.

[*Official Gazette August 18, 1970.*]